Figure 1:
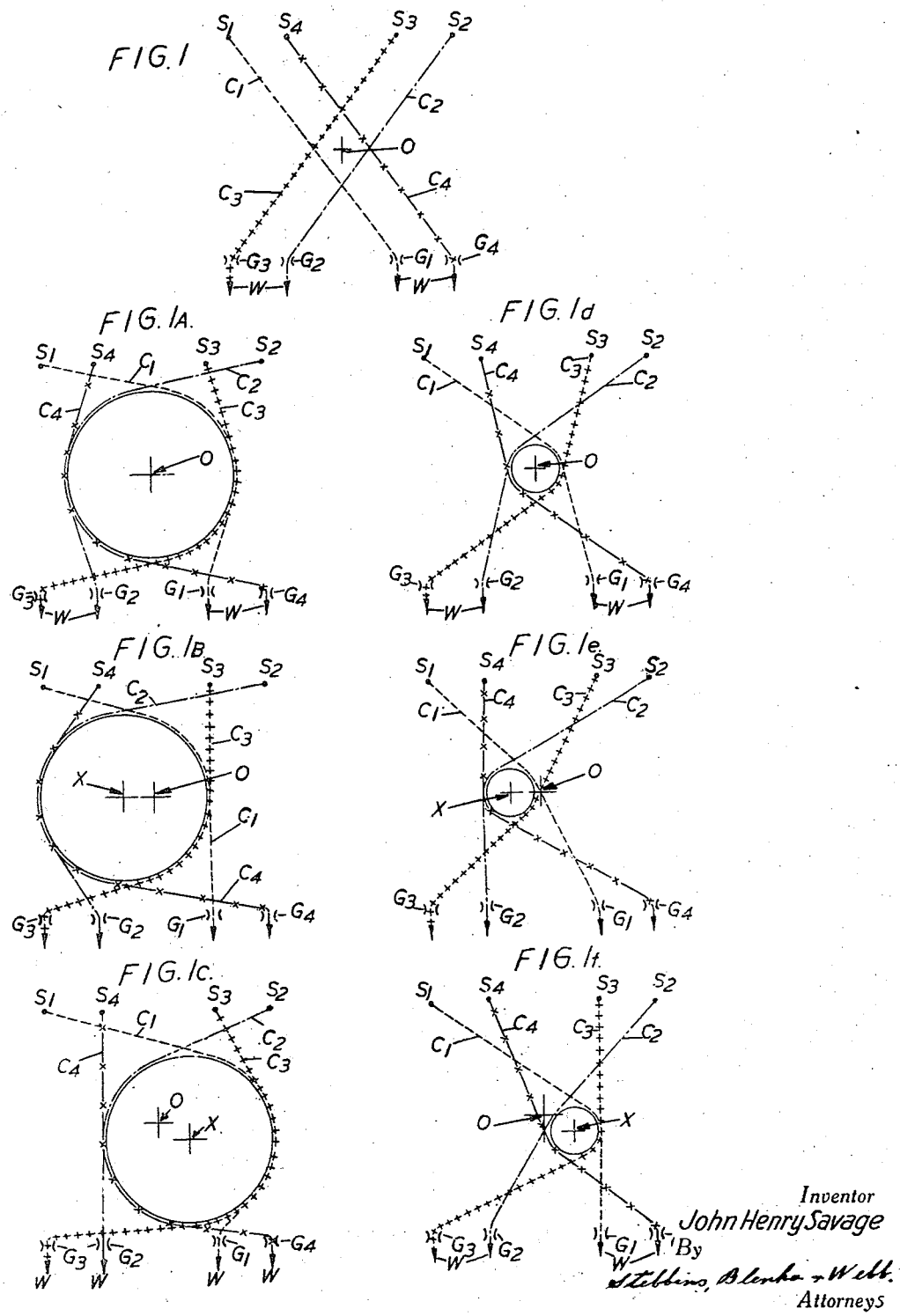

Inventor
John Henry Savage
By
Stebbins, Blenko & Webb.
Attorneys

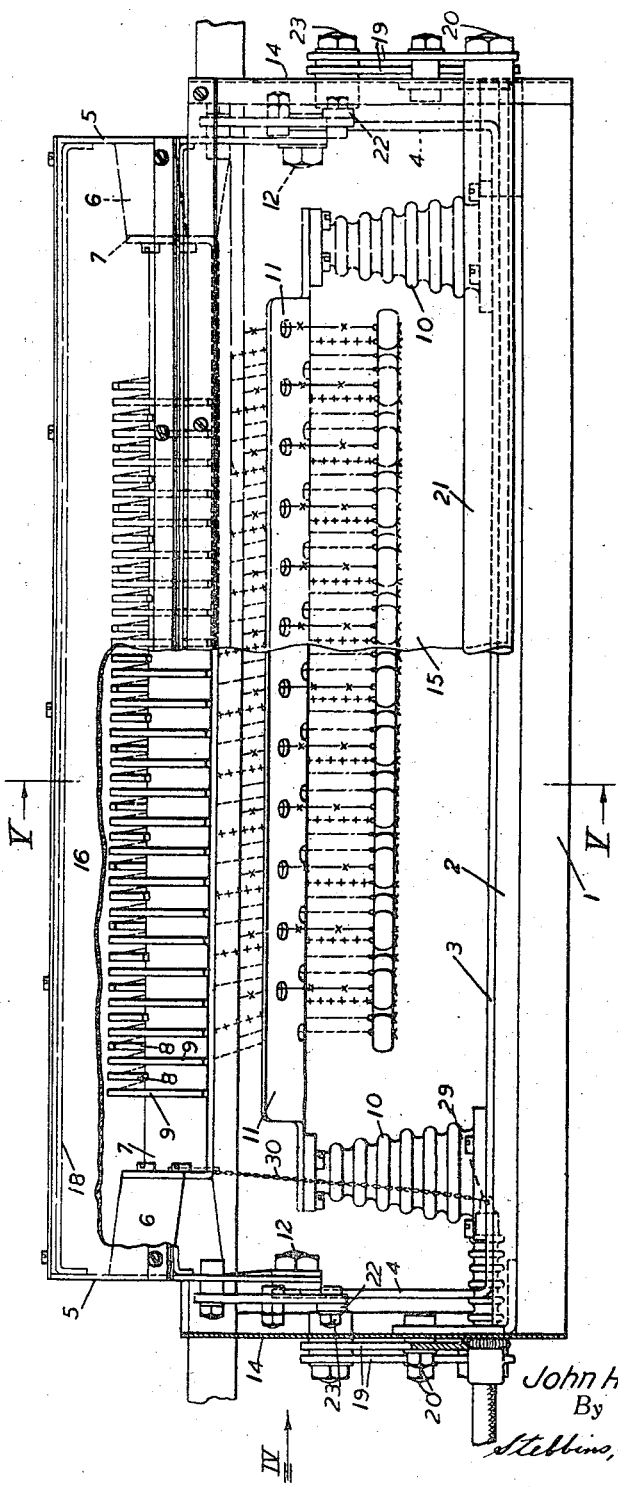

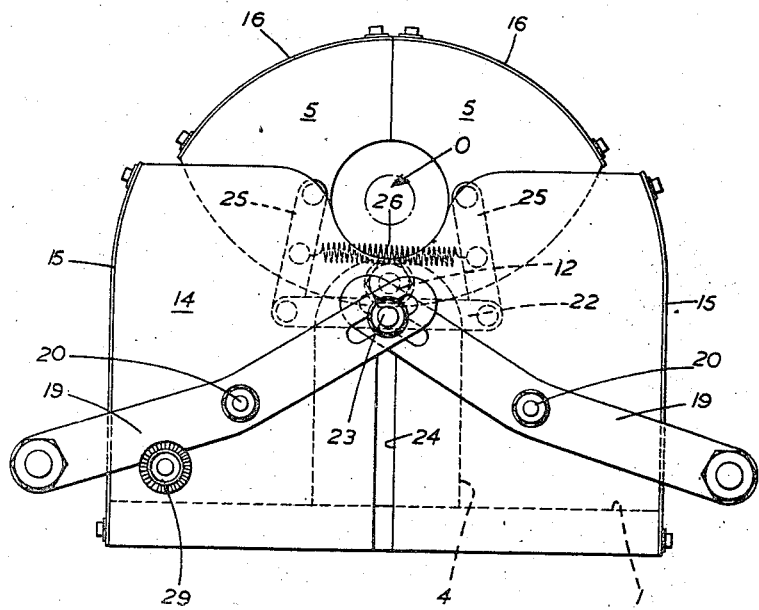

Nov. 16, 1948. J. H. SAVAGE 2,454,011
SPARK TESTING APPARATUS FOR INSULATED
ELECTRIC CABLES AND WIRE
Filed May 2, 1945 6 Sheets-Sheet 5

Inventor
*John Henry Savage*
By
*Stebbins, Blenko & Webb*
Attorneys

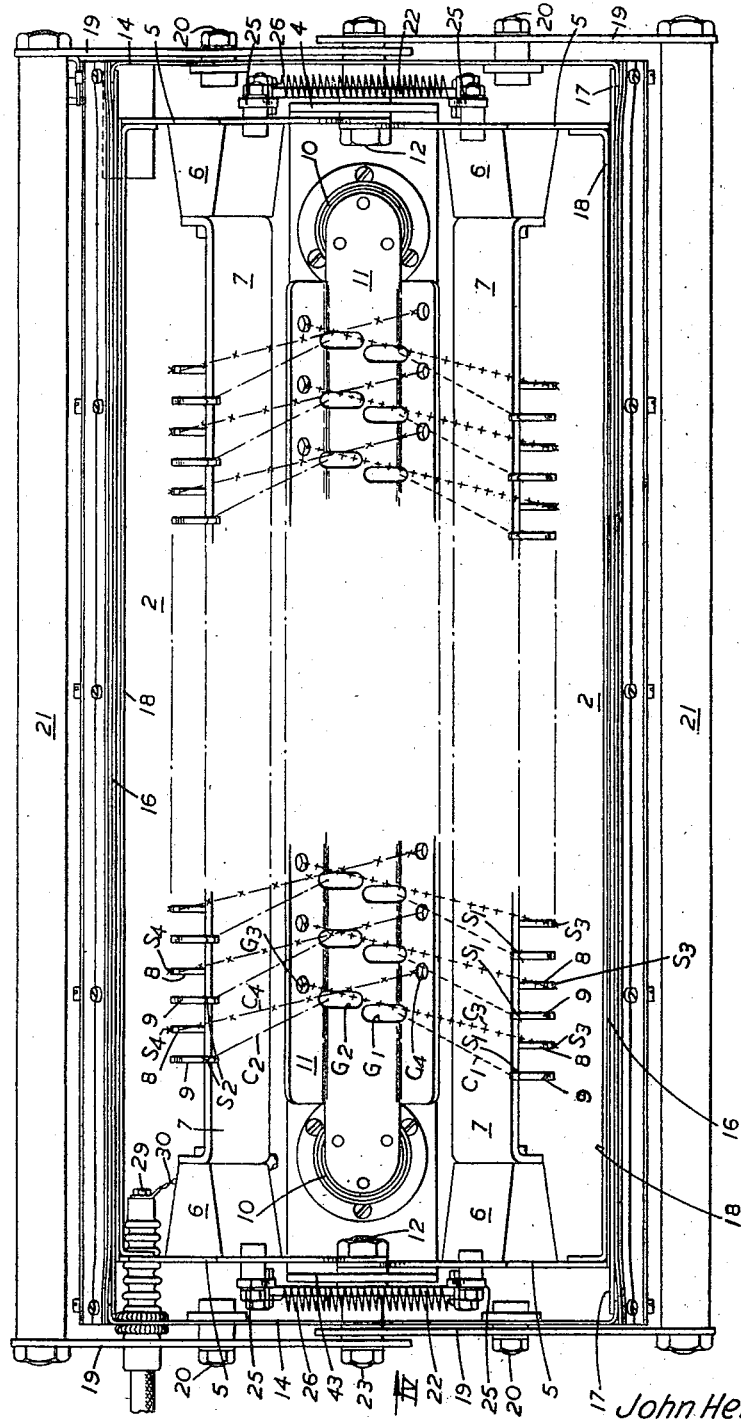

Patented Nov. 16, 1948

2,454,011

UNITED STATES PATENT OFFICE 2,454,011

SPARK TESTING APPARATUS FOR INSULATED ELECTRIC CABLES AND WIRE

John Henry Savage, Welling, England, assignor to W. T. Henley's Telegraph Works Company Limited, Dorking, England, a British company Application May 2, 1945, Serial No. 591,517
In Great Britain May 10, 1944

12 Claims. (Cl. 175—183)

During recent years a method of testing insulated electric cables and wires (hereinafter for convenience included in the term "cables") has come into extensive use for the purpose of indicating the absence of weak spots in the insulation or of locating such spots if they exist. In this method a cable is passed continuously through apparatus in which its insulating covering is subjected to a potential difference established between a conductor inside the covering and an electrode forming part of the apparatus outside the covering, this potential difference being sufficient to produce a discharge of electricity through the covering at any weak spot which may exist therein. This method of testing has become known as "spark testing." An example of apparatus working by this method is given in the specification of Letters Patent No. 2,087,783.

The present invention relates to spark testing apparatus and is concerned with the construction of the electrode by which is applied externally to the cable the electric field used in testing. Such an electrode must have a substantial degree of flexibility so as to remain in contact with the surface of the cable during the movement of this latter through the apparatus at a fairly high speed, allowing for any irregularities in the form of the covering or any temporary displacement of the axis of the cable from the normally intended path. It must also be of robust construction so as to withstand, without serious wear, the continual rubbing of the cable surface and the continual bending which it undergoes in following the changes in that surface. For these reasons it has been usual to employ electrodes composed of a number of chains or chain links associated together. The present invention may make use of chains and hereinafter the word "chain" will be used. It is to be understood, however, that in general, unless the context indicates otherwise, the word is used as indicating by example a flexible conductive member of considerably greater longitudinal extent than width and of a character appropriate for the purpose described herein.

An electrode arrangement must necessarily comprise a number of chains since the periphery of the cable must be made contact with over a considerable axial extent. For instance, British Standard Specification No. 7—1939, which lays down requirements for spark testing of rubber cables, specifies that every point in the cable shall be in the electrode for not less than 0.1 second. Since speeds of passage through the electrode may be of the order of 10 feet per second, it will be seen that electrode lengths in the axial direction should be of the order of one foot to comply with this requirement.

It is also important that the chains should make contact with substantially the whole of the peripheral arc of the cable surface so that, as the cable passes through the electrode, each point on its surface shall pass close to, or preferably in contact with, a part of a chain so that no part of the surface is left untested and that substantially the full potential difference is applied, at each point, to the covering.

In the following description reference is made to "the electrode axis" for the purpose of indicating the position of a line passing longitudinally through the electrode whether the cable is in place within the electrode or not. The position is that which the axis of the cable occupies when placed centrally within the electrode.

By the present invention we provide an electrode for apparatus for spark testing an electric cable formed of chains so arranged that they wrap themselves round the surface of a cable when in position for testing. Each chain thus forms a segmental part of the electrode resting against the cable between two spaced supports. One of each pair of supports is a guide through or over which the chain can move against the action of force tending to hold a part of the chain between the supports in contact with the surface of the cable. This force may be provided by the weight of a part of the chain below the guide or by an additional weight or by a spring. The use of only two chains to form a group is possible but it is more advantageous to use a larger number.

In the previous description reference has been made to supporting each chain at two points. It is to be understood, however, that the guide location need not approximate to a point; the guide may be a slot of considerable length or a pulley. When there is no cable in contact with the electrodes the chains will hang in approximately straight lines between their points of support and they must be deflected on the insertion of the cable so as to wrap round and rest in contact with the surface of the cable. If in this deflection the chain is carried across the electrode axis, a larger arc of contact will be obtained than if the chain is merely carried further away from the electrode axis. For a group of two chains a suitable arrangement is one in which in their free positions, i. e. when not deflected by the presence of a cable in the electrode, the chains hang more or less vertically in spaced relationship, one to each side of the electrode axis, and in the operative positions, each chain is in the form of a loop wrapped round the surface of the cable on the opposite side of the electrode axis from the points of support. For a group of four chains a preferred arrangement is one in which, in their free positions, two of the chains pass obliquely down from left to right of the electrode axis, one over and one under the axis and the other two obliquely downwards from right to left, one over and one under the axis, and in which, in its operative position, each chain lies in contact with that part of the cable surface that lies on the opposite side of the electrode axis to the straight line joining its points of support.

The arrangement of chains in a group in accordance with this invention has an important advantage in that it lends itself to providing for the easy insertion of the cable. This provision is made by supporting one end of each chain on one of a pair of carriers, oppositely movable so as to displace the supports laterally away from their operating position. When this displacement has been carried out, it permits of the cable being inserted by a simple movement instead of being threaded axially through the chains. The carriers can then be moved into the operating position again and, in so doing, wrap the chains round the cable.

To enable the invention to be more fully understood and readily performed examples of electrodes constructed in accordance with the invention and consisting of a number of chains arranged in groups of four will be described with the aid of the accompanying drawings wherein—

Figure 2:
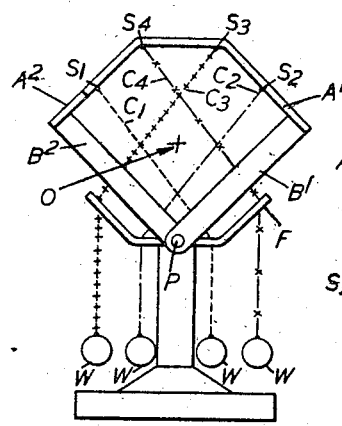
Figure 2A:
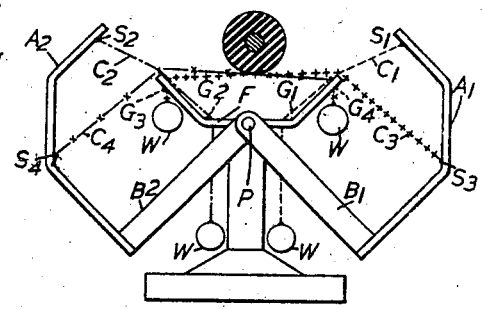
Figure 2B:
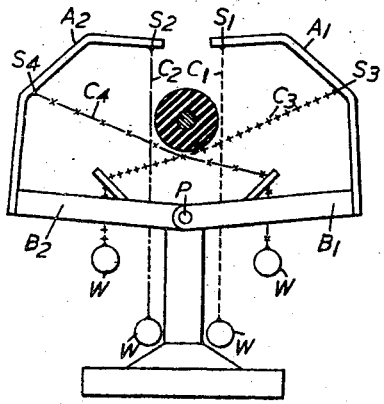
Figure 2C:
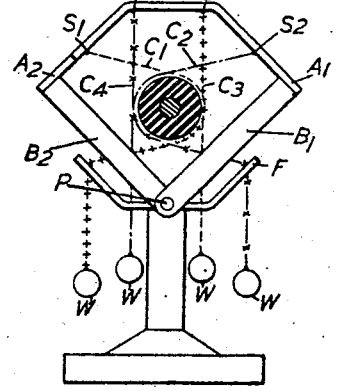
Figure 5:
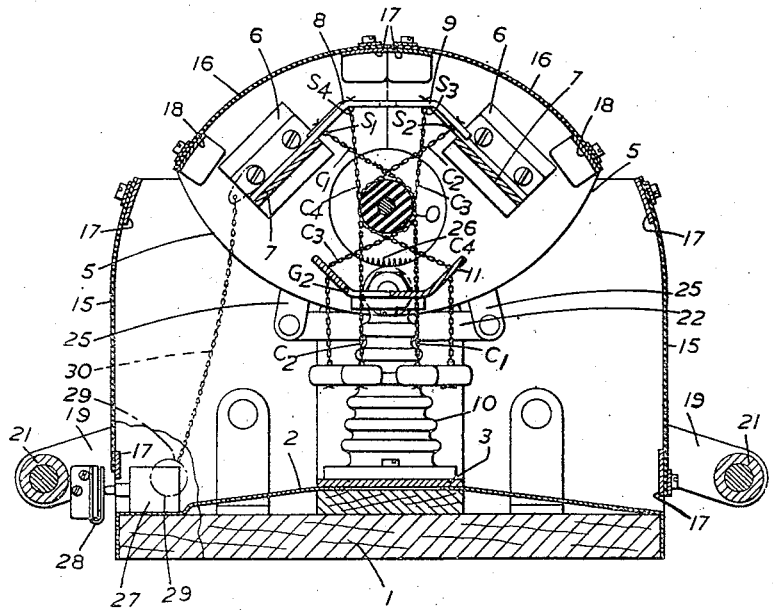
Figure 5A:
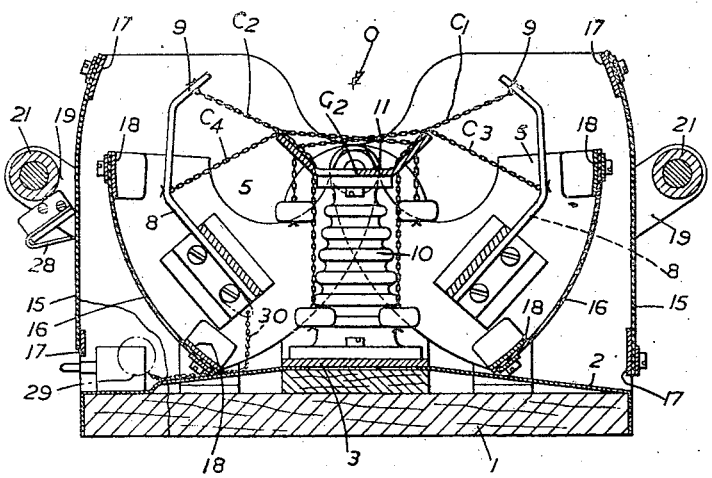

Figure 1 is a diagrammatic representation of a single group of four chains of one form of electrode and showing the positions taken up by the chains before a cable is inserted, Figures 1a to 1f show diagrammatically the positions taken up by the chains of the group shown in Figure 1, following the insertion of cables of two different sizes, centrally in the case of Figures 1a and 1d and off-centre in the case of the remaining figures, Figure 2 shows somewhat diagrammatically an end elevation of a modified form of electrode in which the upper supports are movable to permit easy entry of a cable, and Figures 2a, 2b and 2c, respectively, show the electrode in its open position, the electrode half-closed round a cable and the electrode fully closed round a cable, Figure 3 is a side elevation of a complete spark testing electrode built up of groups of chains of the form shown diagrammatically in Figures 2a to 2c, the electrode being closed about a cable, Figure 4 is an end elevation looking in the direction of the arrow IV in Figure 3, of the electrode shown therein, Figure 5 is a cross-section through the electrode in the closed position, and Figure 5a is a cross-section through the electrode in the open position, both sections being taken on the line V—V of Figure 3, and Figure 6 is a plan of the electrode in the open position.

Referring first of all to Figure 1, it will be seen that for the group of four chains, a set of four support points, $S_1$, $S_2$, $S_3$, $S_4$, is arranged above the electrode axis O and another set of four, $G_1$, $G_2$, $G_3$, $G_4$, below. The support points of each set are spaced apart horizontally, to a slight extent in a longitudinal direction and to a much greater extent in a transverse direction.

The support points $S_1$, $S_2$, $S_3$ and $S_4$ are shown as being the same height above the cable axis but this is by no means essential. The four chains forming a set are designated $C_1$, $C_2$, $C_3$ and $C_4$ and are represented by lines of different form so that the path of each chain of the group may be readily traced. The chains $C_1$, $C_2$, $C_3$ and $C_4$, are fixed at their upper ends to the supports $S_1$, $S_2$, $S_3$ and $S_4$, respectively, and when not deflected by the presence of a cable extend at an inclination of about 45° to the vertical from these support points past the central region of the electrode to and through guides $G_1$, $G_2$, $G_3$ and $G_4$, respectively, which form the lower support points. As will be seen, the upper and lower points of support of each chain are so mutually located that two of the chains, $C_1$ and $C_4$, pass from their support points $S_1$ and $S_4$ in spaced parallel lines diagonally from left to right and two $C_2$ and $C_3$, from right to left. In the central region the four chains enclose between them a parallelogram centrally within which lies the electrode axis O. It will be appreciated that it is by no means essential that each lower support should lie vertically underneath the corresponding upper support. When they do not, the four chains will enclose a quadrilateral that is not a parallelogram. When a cable is introduced into the electrode, each of the four chains is preferably deflected from the straight line position in which it is held by the weight W at its lower end and in such a direction that it moves past the electrode axis (which coincides with that of a centrally placed cable) so as to occupy a position in which it rests on the cable over an arc which, as shown in Figures 1a and 1d, depends upon the size of the cable, and may vary from about 45° to 90°. These arcs do not overlap to any substantial extent, except with large cables where each arc of contact is about 90°, and between them cover the whole or nearly the whole of the periphery of the cable. As the result of the arrangement described, the chains provide a sufficient covering of the periphery of the cable for a large range of sizes of cable. As will be seen from Figures 1b, 1c, 1e and 1f, this is true even where the cable is very considerably off-centre with respect to the electrode. Thus sufficient covering is provided by the chains for all displacements of the cable from the central position in which its axis X and the electrode axis O are coincident, which are likely to occur as the cable runs through the machine. To provide an electrode of adequate length we use a number of groups of chains of the kind just described, one behind the other in the direction of travel of the cable.

In the modified four chain group shown diagrammatically in Figure 2, the four support points above the cable axis are mounted on a pair of oppositely movable carriers to permit easy entry of the cable. Two of these support points, namely, $S_1$ and $S_3$, are carried on an arm $A_1$ and the other two, $S_2$ and $S_4$, on a second arm $A_2$ and the arms $A_1$ and $A_2$ are mounted, by means of brackets $B_1$ and $B_2$, respectively, on a pivot or pivots P placed on an insulating support below the electrode axis O, so that the arms may be swung apart outwards and downwards carrying the upper ends of the chains with them. The chain supports below the electrode axis are provided by an appropriately apertured fixed plate F which is also on an insulating support. Thus each arm supports one chain which passes from left to right and one which passes from right to left and before opening the electrode for the insertion of a cable, we have the chains hanging from the arms in the diagonal arrangement described with reference to Figure 1. As the carriers are swung apart outwards and downwards they carry the upper ends of the chains well away from the central region leaving an open arrangement of chains extending mainly transversely and at the sides of the central region between their four supports and the four guides below as shown in Figure 2a. The cable can then be placed over these chains after which the two carriers can be swung upwards and inwards and restored to their original positions. In this movement the chains if free, would pass across the axis of the electrode so that when prevented by the presence of a cable they wrap themselves round the cable. The movements of opening and closing are facilitated by making the guides $G_1$ and $G_2$, for the lower ends of the chains $C_1$ and $C_2$, in the form of transverse slots in the guide plate F so that these chains can move across these slots freely. This reduces the length of chain necessary and the vertical extent of movement of the weighted ends.

The chain electrode shown in Figures 3, 4, 5 and 6 of the drawings, by way of example, embodies the same principles as regards the disposition of the chains of each group as described with reference to the preceding figures of the drawings but differs as regards details of construction and in describing it various modifications that may be made thereto will be pointed out. The device is built up on a rectangular base 1. This may be of metal but conveniently is of wood with a covering 2 of sheet metal, which preferably slopes downwards towards the sides of the base, as shown in Figures 5 and 5a. On this base is a support bracket comprising a base part 3 extending almost from end to end of the base 1 and having at each end an upstanding arm 4 to the upper end of each of which are pivotally secured, so as to be capable of swinging about a common axis, two sector shaped end plates 5, with semi-circular notches in their adjacent radial edges to provide a cable entry or exit. Mounted on the inner face of each end plate is an insulating support 6 for one end of one of a pair of longitudinally extending bridges 7. Each bridge carries a number of chain support fingers disposed in pairs, each pair consisting of one short finger 8 and one long finger 9. The fingers on one bridge are staggered with respect to those on the other so that the long fingers on one bridge fit between two adjacent fingers on the other bridge when the two bridges are swung inwards. The sector shaped end plates, bridges and support fingers constitute a pair of carriers oppositely movable to displace the supports laterally to and from their operating positions.

Between the bracket arms 4 are mounted a pair of insulating supports 10 for a horizontal trough shaped plate 11 in which are four longitudinal rows of holes forming guides for the chains $C_1$, $C_2$, $C_3$ and $C_4$ dependent from the support fingers 8 and 9. As will be seen the holes forming the guides $G_1$ and $G_2$ for the chains $C_1$ and $C_2$ of each group of four are transversely slotted for reasons previously explained. It will also be observed that the guide for each chain is displaced endwise in the direction of the electrode axis relative to the upper support point with which it is associated. Providing the cable is run through in the appropriate direction, i. e. in the direction of the arrow IV, so that each guide is located in advance of the associated upper support point, the friction of the chains in the guides is decreased. Such a displacement also gives a greater effective axial extent for each group of chains in building-up the electrode.

It is sometimes advantageous to provide that the electrode is not damaged if any lateral projection, such as the bent end of a length of cable, should catch in the electrode as the cable is pulled through. This can conveniently be done in the present case by arranging that one end of each chain is connected with its support or with the weight or spring at the other end by a friction grip or by a connection of some other kind which, when the pull exceeds a predetermined amount, will be released. In the arrangement shown in the drawings, each weight is connected to its chain by a split pin 13 which grips the walls of a central hole in the weight sufficiently to retain the weight under normal running conditions, but allows it to slide off and free the lower end of the chain should the chain be momentarily caught up by a projection on the cable. Alternatively the length of chain beneath the lower support may be increased to an extent permitting the detachable weight to be dispensed with.

It is a common practice to enclose the electrode system of a spark testing apparatus in an earthed metal screen and to provide that this can be opened up when required, suitable interlocking arrangements being provided to prevent opening when the electrode is alive. When used with such an arrangement the electrode structure described above can, with advantage, be coupled to the screen so that the screen and the electrode may be opened and closed simultaneously, thus facilitating the placing of the cable in the electrode and simplifying the safety interlocking arrangements.

To provide a screen for the electrode shown in Figures 3-6 of the drawings, the base of the apparatus is fitted with a pair of end walls 14 and a pair of side walls 15 which rise to a height just above the electrode axis, the end walls being notched to clear the largest diameter cable which the apparatus is intended to take. A cover for this walled-in base is provided by a pair of cover plates 16 extending between the arcuate edges of the sector plates. In this way, as will be most clearly seen in Figure 5 of the drawings, when the electrode structure is in the closed or operative position it is screened by the walls 14 and 15 and cover plates 16, but as will be seen from Figure 5a, is rendered very accessible when in the inoperative position, as each cover plate falls below the top of the adjacent side wall. The walls and cover plates forming the screen may be of perforated sheet metal or wire gauze but it is preferred to make the end walls only of metal and the side walls 15 and cover plates 16 of a transparent plastic to allow of visual observations of the cable under test. In this case the sheet plastic walls 15 are secured to supports 17 carried by the end plates 14, and the cover plates each on brackets 18 which extend from a sector plate 5 at one end of the apparatus to the corresponding plate 5 at the other end.

The bridge structures 7 carrying the chain support fingers 8 and 9 and the cover plates may be swung about their common pivotal supports 12 by any convenient operating gear, of which the link arrangement shown in Figures 4 to 6 of the drawings is merely an example. As will be seen, at each end of the apparatus are a pair of levers 19 centrally supported on pivots 20 carried by the adjacent end wall 14. The outer ends of the levers project beyond the side walls 15 and are coupled by tubular rods 21, one along each side wall, which serve as operating handles. At their inner ends the levers at each end of the apparatus are slotted and a horizontally extending link 22 is centrally coupled thereto by a pivot pin 23 which passes through the slots at their intersection points and through a vertical slot 24 in the end wall 15. Each end of each horizontal link 22 is pivotally connected by a link 25 to the adjacent sector shaped end plate 5 at a point about midway between its pivot point and centre point of its arcuate edge. The two links 25 are drawn towards one another by a tensioned spring 26 which thus serves to hold the swinging sector plates either in the closed or in the fully open position. By this means the electrode system is opened to receive a cable simply by lifting the handles 21 and is closed and fully screened again by pressing down the handles 21.

To ensure that the electrode cannot be exposed when alive, the high tension supply to the electrode is controlled by a press button switch 27 which is closed by a spring contact 28 carried on one of the links 19 when the chain support structures are swung into their operative positions and their screens are closed, and opened as soon as the screens begin to open. This switch 27 is preferably inserted on the primary side of a step-up transformer supplying the electrode. As an additional safeguard the connection from the H. T. supply terminals 29 to the bridge structure is by a chain 30. As the electrode is opened, the upper point of attachment of the chain is lowered and the surplus chain allowed to rest on the earthed sheet metal covering 2 on the base 1.

It is to be understood that the preceding description of the arrangement of carriers and chain supports is only given by way of example, primarily to illustrate the nature of the movements to be carried out. Other arrangements to the same end may be adopted, for instance, instead of a swinging movement for bridges and their support fingers the necessary displacement may be obtained by sliding these parts in a plane.

What I claim as my invention is:

1. An electrode for apparatus for spark testing electric cable when placed within the electrode, said electrode comprising a series of electrically inner-connected chains forming a flexible curtain surrounding and conforming to the shape of a cable in position for testing, said chains extending transversely of the direction of run of the cable along the axis of the electrode and being set in sequence along this direction forming a conductor distributed around said axis, means for supporting each of said chains at one end and means for tensioning each of said chains at the other end.

2. An electrode for apparatus for spark testing electric cable when placed within the electrode, said electrode comprising two sets of chains, said chains running transversely of an axis and distributed along the two sides thereof, means for supporting each chain of one set by one of its ends, means for supporting each chain of the other set by one of its ends, means for applying guided tension to the other end of each of said chains and means for giving to said supporting means relative movement transverse to said axis thereby to separate the two sets of chains for the insertion of a cable between them and to reverse the movement to wrap said chains over the surface of the inserted cable.

3. An electrode for apparatus for spark testing electric cable when placed within the electrode, said electrode comprising a series of electrically inter-connected chains forming a flexible curtain surrounding and conforming to the shape of a cable in position for testing, said chains extending transversely of the direction of run of the cable along the axis of the electrode and being set in sequence along this direction forming a conductor distributed around said axis, two supports for each of said chains, one above and one below the said axis, the lower supports being guides, tensioning means for said chains located below said guides, the upper supports for the chains being a pair of carriers relatively movable transverse to the said axis.

4. An electrode for apparatus for spark testing electric cable when placed within the electrode, said electrode comprising two sets of chains, said chains running transversely of an axis and distributed along the two sides thereof, means for supporting each chain of one set by one of its ends, means for supporting each chain of the other set by one of its ends, means for applying guided tension to the other end of each of said chains, each of said support means being a carrier which is pivotal about an axis below the said axis and parallel thereto, and means for giving to said carriers movements in opposite senses about their pivots thereby to separate the two sets of chains for the insertion of a cable between them, on reversing these movements, to wrap said chains over the surface of the inserted cable.

5. An electrode for apparatus for spark testing electric cable when placed within the electrode, said electrode comprising a series of electrically inter-connected chains forming a flexible curtain surrounding and conforming to the shape of a cable in position for testing, said chains extending transversely of the direction of run of the cable along the axis of the electrode and being set in sequence along this direction forming a conductor distributed around said axis, means for suspending each of said chains from one end above said axis, a longitudinally extending plate below said axis having holes for the passage of the said chains therethrough, said holes serving as guides for said chains and means below said plate for applying tension to said chains.

6. An electrode as specified in claim 5, wherein each guide hole in the longitudinally extending plate is displaced longitudinally relative to the upper support point of the chain passing through it thereby to give an inclination to said chains.

7. An electrode as specified in claim 5, wherein the lower end of each chain carries a weight, said weight being secured to said chain by a releasable coupling, whereby the weight is released in the event of the chain being caught by the cable and drawn up through the guide.

8. An electrode for apparatus for spark testing electric cable when placed within the electrode, said electrode comprising two parallel sets of electrically inter-connected chains forming a flexible curtain surrounding and conforming to the shape of a cable in position for testing, said chains extending transversely of the direction of run of the cable along the axis of the electrode and being set in sequence along this direction forming a conductor distributed around said axis, guiding and tensioning means for said chains located below said axis, a pair of bridges extending longitudinally of the electrode each supporting one of the sets of chains at points above the said axis, end supports for supporting each of said bridges in an operative position in the form of approximately sector-shaped plates pivoted near the apex of the sector about an axis extending longitudinally of and below the said axis and, in the operative position of the chains, having their arcuate edges uppermost and their inner radial edges substantially in contact with the inner edges of the end supports of the other bridge and notched to provide an opening for the cable, and a pair of cover plates for shielding the electrode and the bridges, each cover plate extending from the arcuate edge of one sector-shaped plate supporting one end of one of the bridges to the corresponding edge of the sector plate supporting the other end of the same bridge, the sector-shaped end supports for each bridge being rotatable in a direction to separate the cover plates and the chains depending from each bridge.

9. An electrode for apparatus for spark testing electric cable when placed within the electrode, said electrode comprising two parallel sets of electrically interconnected chains forming a flexible curtain surrounding and conforming to the shape of a cable in position for testing, said chains extending transversely of the direction of run of the cable along the axis of the electrode and being set in sequence along this direction forming a conductor distributed around said axis, guiding and tensioning means for said chains located below said axis, a pair of bridges extending longitudinally of the electrode each supporting one of the sets of chains at points above the said axis, end supports for supporting each of said bridges in an operative position, in the form of approximately sector-shaped plates pivoted with respect to said base and near the apex of the sector about an axis extending longitudinally of and below the axis of the electrode and in the operative position having their arcuate edges uppermost and their inner radial edges substantially in contact with the inner radial edges of the end supports of the other bridge and notched to provide an opening for the cable, an enclosure for the electrode and its support, said enclosure comprising the base, and side walls and end walls all upstanding from said base, said end walls being notched to expose the cable openings in the sector shaped end supports, the end supports and a pair of cover plates each extending from the arcuate edge of one sector-shaped plate supporting one end of one of the bridges to the corresponding edge of the sector plate supporting the other end of the same bridge and each having a lower edge lying adjacent the upper edge of the neighboring side wall, and means for rotating the sector shaped end supports for each bridge in opposite directions to separate the cover plates and lower the bridges thereby moving apart the chains depending from each bridge.

10. Apparatus for spark testing electric cables comprising a base having a grounded conductive surface, an electrode comprising chains forming a flexible curtain surrounding and conforming to the shape of a cable in position for testing, said chains extending transversely of the direction of run of the cable along the axis of the electrode and being set in sequence along this direction forming a conductor distributed around said axis, a plurality of guides, one for each chain, mounted above and insulated from the grounded surface of said base and supporting the chains at points below the said axis of the electrode, a pair of bridges extending longitudinally of the electrode supporting the chains above the said axis and electrically interconnecting them, and supports supporting each of said bridges close together in the operative position, said end supports being pivoted with respect to said base about an axis extending longitudinally of and below the axis of the electrode, means for rotating said bridges and their pivoted end supports, each bridge in a direction to lower it, means for insulating said interconnected chains from the grounded surface of said base, a chain for connecting said electrode to a source of high tension electric supply, the last said chain being attached at its upper end to one of said bridges and being of such a length that as the electrode is opened and the upper point of attachment of the connecting chain is lowered, the surplus chain falls on to the grounded surface of said base.

11. A device for forming an electrode about the electric cable, suitable for spark testing, comprising a plurality of upper chain supports disposed above the axis of the electrode and arranged in four laterally spaced parallel rows, the supports in each row being longitudinally staggered relative to those in the remaining rows and, disposed below the said axis, a plurality of correspondingly positioned lower chain supports in the form of guides, and a plurality of chains, each attached to an upper support and passing through a lower support, the chains depending from one outside row of upper supports and those depending from the neighboring inside row of upper supports passing obliquely downwards and respectively through the inside and outside rows of guides diagonally opposite the said outside and neighboring inside rows of upper supports, and the chains depending from the other outside row of upper supports and those depending from the neighboring inside row of upper supports passing obliquely downwards and respectively through the inside and the outside rows of guides diagonally opposite the said other outside and neighboring inside rows of upper supports, the chains of each group of four neighboring chains, when viewed along the axis of the electrode, forming between them, in the absence of a cable from the electrode, a quadrilateral through which passes the electrode axis.

12. A device for forming a chain electrode about an electric cable suitable for spark testing, comprising a pair of bridges extending longitudinally parallel with, and one to each side of, the axis of the electrode, a series of alternate long and short chain support fingers projecting laterally from each bridge, a trough-shaped plate extending longitudinally beneath the electrode axis, a plurality of chains depending from said chain support fingers and passing through guides constituted by holes in said trough-shaped plate, pivotally mounted end supports for each bridge supporting it in an operative position in which its long support fingers extend over the electrode axis and interdigitate with the fingers of the other bridge and, in the absence of a cable from the electrode, each group of four axially successive dependent chains, when viewed along the electrode axis, form a quadrilateral, and means for swinging the pivotally mounted end supports and their bridges outwards from their operative position to an inoperative position in which the electrode is open and the fingers and their dependent chains lie away from and to the sides of the electrode axis.

JOHN HENRY SAVAGE.

REFERENCES CITED

The following references are of record in the file of this patent:

UNITED STATES PATENTS

| Number | Name | Date |
|---|---|---|
| 1,561,483 | Pickard | Nov. 17, 1925 |
| 1,952,582 | Cary et al. | Mar. 27, 1934 |

FOREIGN PATENTS

| Number | Country | Date |
|---|---|---|
| 24,888 | Great Britain, 1895 | Nov. 7, 1896 |